United States Patent
Kim et al.

(10) Patent No.: US 9,112,424 B2
(45) Date of Patent: Aug. 18, 2015

(54) POWER SUPPLY DEVICE HAVING IMPROVED POWER CONVERSION EFFICIENCY IN LIGHT LOAD CONDITIONS

(71) Applicant: SAMSUNG ELECTRO-MECHANICS CO., LTD., Suwon, Gyunggi-do (KR)

(72) Inventors: Chong Eun Kim, Gyunggi-do (KR); Jeong Nam Lee, Gyunggi-do (KR); Duk You Kim, Seoul (KR); Gun Woo Moon, Daejeon (KR); Don Sik Kim, Gyunggi-do (KR)

(73) Assignees: SAMSUNG ELECTRO-MECHANICS CO., LTD., Suwon-Si, Gyeonggi-Do (KR); Korea Advanced Institute of Science and Technology, Daejeon (KR)

( * ) Notice: Subject to any disclaimer, the term of this patent is extended or adjusted under 35 U.S.C. 154(b) by 4 days.

(21) Appl. No.: 13/915,244

(22) Filed: Jun. 11, 2013

(65) Prior Publication Data
US 2014/0177282 A1    Jun. 26, 2014

(30) Foreign Application Priority Data
Dec. 21, 2012 (KR) .......................... 10-2012-0151307

(51) Int. Cl.
*H02M 3/335* (2006.01)

(52) U.S. Cl.
CPC ........ *H02M 3/33592* (2013.01); *H02M 3/3353* (2013.01); *H02M 3/33507* (2013.01); *H02M 3/33569* (2013.01); *H02M 3/33576* (2013.01)

(58) Field of Classification Search
CPC .................... H02M 3/33507; H02M 3/33569; H02M 3/33592

USPC .......... 363/17, 21.02–21.18, 97–98, 127–132
See application file for complete search history.

(56) References Cited

U.S. PATENT DOCUMENTS

| 4,864,479 | A | * | 9/1989 | Steigerwald et al. | ........... 363/17 |
| 5,060,130 | A | * | 10/1991 | Steigerwald | .................... 363/65 |
| 5,262,930 | A | * | 11/1993 | Hua et al. | ................... 363/21.03 |
| 5,414,238 | A | * | 5/1995 | Steigerwald et al. | .... 219/121.54 |

(Continued)

FOREIGN PATENT DOCUMENTS

| JP | 2011-151949 A | 8/2011 |
| KR | 2001-0095453 A | 11/2001 |
| KR | 2006-0086060 A | 7/2006 |

OTHER PUBLICATIONS

Notice of Office Action Korean Patent Application No. 10-2012-0151307 dated Nov. 27, 2013 with English translation.

(Continued)

*Primary Examiner* — Fred E Finch, III
*Assistant Examiner* — Yusef Ahmed
(74) *Attorney, Agent, or Firm* — McDermott Will & Emery LLP

(57) ABSTRACT

There is provided a phase shift full bridge (PSFB) type power supply device controlling a switching on time of lagging leg switches according to a load state. The power supply device includes a power supply unit supplying preset DC power by switching input power using a full bridge by a phase shift method; and a control unit controlling a switching time of a switch of the full bridge according to a load state in which the DC power is received from the power supply unit.

8 Claims, 5 Drawing Sheets

(56) References Cited

U.S. PATENT DOCUMENTS

| | | | | |
|---|---|---|---|---|
| 5,838,558 A * | 11/1998 | Tan et al. | ............... | 363/91 |
| 6,246,599 B1 * | 6/2001 | Jang et al. | ............... | 363/132 |
| 6,310,785 B1 * | 10/2001 | Ayyanar et al. | ............... | 363/17 |
| 6,356,462 B1 * | 3/2002 | Jang et al. | ............... | 363/17 |
| 6,466,459 B1 * | 10/2002 | Guerrera | ............... | 363/17 |
| 6,504,739 B2 * | 1/2003 | Phadke | ............... | 363/127 |
| 6,567,285 B2 * | 5/2003 | Cho et al. | ............... | 363/132 |
| 6,611,444 B2 * | 8/2003 | Ayyanar et al. | ............... | 363/132 |
| 6,888,728 B2 * | 5/2005 | Takagi et al. | ............... | 363/17 |
| 6,992,902 B2 * | 1/2006 | Jang et al. | ............... | 363/17 |
| 7,616,462 B2 * | 11/2009 | Millner et al. | ............... | 363/63 |
| 7,638,904 B2 * | 12/2009 | Shoji et al. | ............... | 307/154 |
| 7,791,904 B2 * | 9/2010 | Zhang et al. | ............... | 363/17 |
| 7,796,406 B2 * | 9/2010 | Lev | ............... | 363/21.02 |
| 7,911,810 B2 * | 3/2011 | Shimada et al. | ............... | 363/17 |
| 8,036,000 B2 * | 10/2011 | Ying et al. | ............... | 363/21.02 |
| 8,644,035 B2 * | 2/2014 | Pahlevaninezhad et al. | ... | 363/17 |
| 8,665,622 B2 * | 3/2014 | Kim et al. | ............... | 363/131 |
| 8,780,585 B2 * | 7/2014 | Ye | ............... | 363/17 |
| 8,786,204 B2 * | 7/2014 | Park et al. | ............... | 315/206 |
| 2006/0152947 A1 * | 7/2006 | Baker et al. | ............... | 363/16 |
| 2008/0247194 A1 * | 10/2008 | Ying et al. | ............... | 363/17 |
| 2009/0231884 A1 * | 9/2009 | Bong et al. | ............... | 363/17 |
| 2009/0244934 A1 * | 10/2009 | Wang et al. | ............... | 363/21.06 |
| 2010/0002471 A1 * | 1/2010 | Heo et al. | ............... | 363/17 |
| 2010/0014321 A1 * | 1/2010 | Won et al. | ............... | 363/17 |
| 2011/0273909 A1 * | 11/2011 | Christopher | ............... | 363/17 |
| 2011/0317452 A1 * | 12/2011 | Anguelov et al. | ............... | 363/21.02 |
| 2012/0008359 A1 * | 1/2012 | Greenfeld | ............... | 363/132 |
| 2012/0063177 A1 * | 3/2012 | Garrity | ............... | 363/37 |
| 2012/0155119 A1 * | 6/2012 | Kim et al. | ............... | 363/17 |
| 2012/0163036 A1 * | 6/2012 | Kim et al. | ............... | 363/17 |
| 2013/0099787 A1 * | 4/2013 | Lu et al. | ............... | 324/319 |
| 2013/0162048 A1 * | 6/2013 | Kim et al. | ............... | 307/82 |

OTHER PUBLICATIONS

Gwan-Bon Koo et al., "New Zero-Voltage-Switching Phase-Shift-Full-Bridge Converter with Low Conduction Losses", IEEE Transactions on Industrial Electronics, vol. 52, No. 1, Feb. 2005, pp. 228-235.

Ken Dierberger, "Application Note: A New Generation of Power MOSFET Offers Inproved Performance at Reduced Cost", Advanced Power Technology, APT9703, Dec. 1997, pp. 1-12.

\* cited by examiner

POWER SUPPLY DEVICE HAVING IMPROVED POWER CONVERSION EFFICIENCY IN LIGHT LOAD CONDITIONS

CROSS-REFERENCE TO RELATED APPLICATIONS

This application claims the priority of Korean Patent Application No. 10-2012-0151307 filed on Dec. 21, 2012, in the Korean Intellectual Property Office, the disclosure of which is incorporated herein by reference.

BACKGROUND OF THE INVENTION

1. Field of the Invention

The present invention relates to a power supply device having improved power conversion efficiency in light load condition.

2. Description of the Related Art

Recently, various types of electronic devices, such as computers, display devices, various control devices, and the like that meet various requirements have been used domestically, commercially and industrially.

These electronic devices have essentially adopted a power supply device supplying required driving power so as to perform various operations while meeting various requirements.

Meanwhile, in order to meet the requirements of high power specifications, in the foregoing power supply device, a full bridge converter capable of reducing a switching loss by implementing zero voltage switching using a phase shift control has been prevalently used.

The foregoing full bridge converter may include two leading leg switches and two lagging leg switches, similarly to the invention disclosed in the following related art document.

However, in case of the leading leg switch, the zero voltage switching can be made in the overall load region, but in case of the lagging leg switch, as the load is decreased, the zero voltage switching may not be smoothly performed, and thus, the power conversion efficiency may be drastically degraded in a light load region.

RELATED ART DOCUMENT (Patent Document 1) Korean Patent Laid-Open Publication No. 10-2001-0095453

SUMMARY OF THE INVENTION

An aspect of the present invention provides a phase shift full bridge (PSFB) type power supply device controlling a switching time of lagging leg switches according to a load state.

According to an aspect of the present invention, there is provided a power supply device, including: a power supply unit supplying preset DC power by switching input power using a full bridge by a phase shift method; and a control unit controlling a switching time of a switch of the full bridge according to a load state in which the DC power is received from the power supply unit.

The switch of the full bridge of the power supply unit may include: first and second leading leg switches; and first and second lagging leg switches.

The control unit may control a switching time of at least one of the first and second lagging leg switches according to the load state.

The control unit may delay a switching on time of at least one of the first and second lagging leg switches according to the load state.

The control unit may include: a comparison unit comparing received load state information with a preset reference load state; and a signal generation unit generating first and second leading leg switching control signals and first and second lagging leg switching control signals and delaying a switching on time of at least one of the first and second lagging leg switching control signals according to a comparison result of the comparison unit.

The power supply unit may include: a transformer having a primary winding receiving power switched by the switch of the full bridge and a secondary winding electrically isolated from and magnetically coupled to the primary winding to form a preset winding ratio therewith, transforming the switched power according to the winding ratio and outputting the transformed power; and an output unit rectifying and stabilizing the transformed power from the secondary winding of the transformer and outputting the stabilized power.

The output unit may include: first and second rectifying switches connected to one end and the other end of the secondary winding, respectively; and an inductor and a capacitor stabilizing the power rectified by the first and second rectifying switches.

According to another aspect of the present invention, there is provided a power supply device, including: a power supply unit supplying preset DC power by switching input power using a full bridge by a phase shift method and rectifying and stabilizing transformed switching power; and a control unit controlling a switching time of a switch of the full bridge by determining a load state in which the DC power is received from the power supply unit, based on resonance between the switch of the full bridge and an output capacitor and a parasitic inductor of a rectifying switch.

The control unit may include: a comparison unit comparing received load state information with a reference load state set according to the resonance between the switch of the full bridge and the rectifying switch; and a signal generation unit generating first and second leading leg switching control signals and first and second lagging leg switching control signals and delaying a switching on time of at least one of the first and second lagging leg switching control signals according to a comparison result of the comparison unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
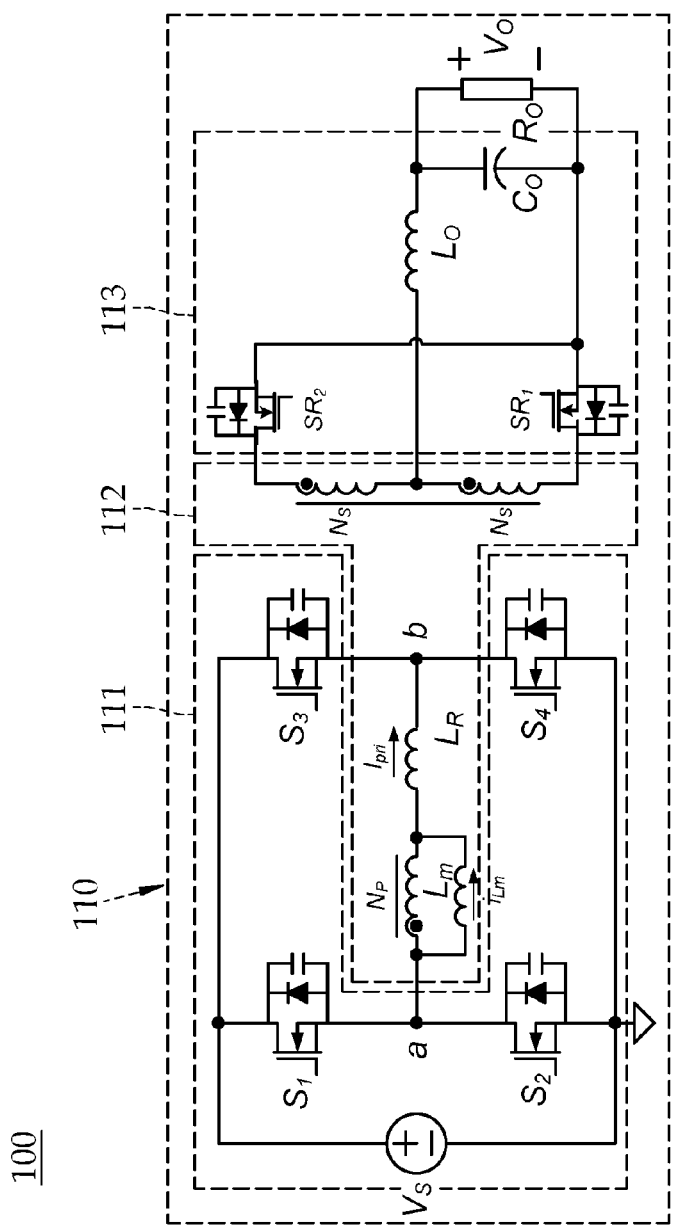
FIG. 1 is a circuit diagram schematically illustrating a power supply device according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the same or like reference numerals will be used to designate the same or like elements.

FIG. 1 is a circuit diagram schematically illustrating a power supply device according to an embodiment of the present invention.

Referring to FIG. 1, a power supply device 100 according to an embodiment of the present invention may include a power supply unit 110 and a control unit 120.

The power supply unit 110 may include a full bridge 111, a transformer 112, and an output unit 113.

The full bridge 111 may include first and second leading leg switches $S_1$ and $S_2$ and first and second lagging leg switches $S_3$ and $S_4$. The first and second leading leg switches $S_1$ and $S_2$ and the first and second lagging leg switches $S_3$ and $S_4$ of the full bridge 111 may individually carry out switching on/off that may be controlled by a phase shift method.

The transformer 112 may have a primary winding Np disposed on a primary side and a secondary winding Ns electrically isolated from and magnetically connected to the primary winding Np and disposed on a secondary side. The primary winding Np and the secondary winding Ns form a preset winding ratio, and may transform power switched by the full bridge 111 according to the winding ratio and output the transformed power.

The output unit 113 may include first and second rectifying switches $SR_1$ and $SR_2$ individually rectifying the transformed power from the secondary winding Ns, and an inductor Lo and a capacitor Co stabilizing the power rectified by the first and second rectifying switches $SR_1$ and $SR_2$.

The control unit 120 may provide switching control signals SS1, SS2, SS3, and SS4 controlling the switching of the first and second leading leg switches $S_1$ and $S_2$ and the first and second lagging leg switches $S_3$ and $S_4$ of the full bridge 111 according to a load state.

Figure 2:
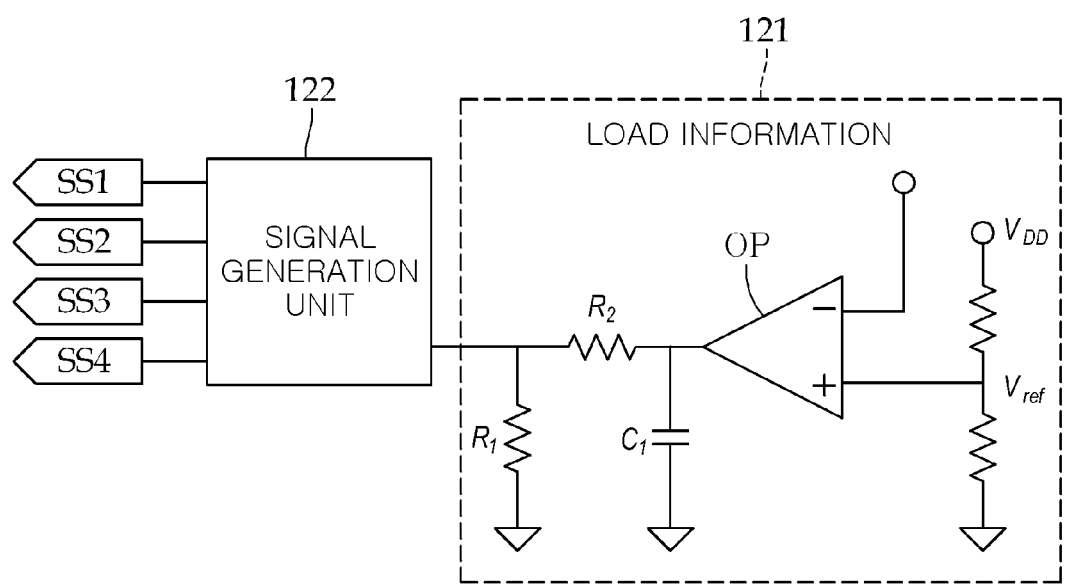
FIG. 2 is a circuit diagram schematically illustrating a control unit employed in the power supply device according to the embodiment of the present invention.

FIG. 2 is a circuit diagram schematically illustrating a control unit employed in the power supply device according to the embodiment of the present invention.

Referring to FIGS. 1 and 2, the control unit 120 of the power supply device 100 according to the embodiment of the present invention may include a comparison unit 121 and a signal generation unit 122.

The comparison unit 121 may include a comparator OP comparing a preset reference load state with detected load state information, and a stabilization circuit $R_1$, $R_2$, and $C_1$ stabilizing a comparison result signal of the comparator OP.

The signal generation unit 122 may generate the switching control signals SS1, SS2, SS3, and SS4 controlling the switching of the first and second leading leg switches $S_1$ and $S_2$ and the first and second lagging leg switches $S_3$ and $S_4$. In this case, the signal generation unit 122 may delay a switching on time of at least one of the lagging leg switching control signals SS3 and SS4 controlling the switching of the first and second lagging leg switches $S_3$ and $S_4$ according to the comparison result signal of the comparison unit 121.

Figure 3:
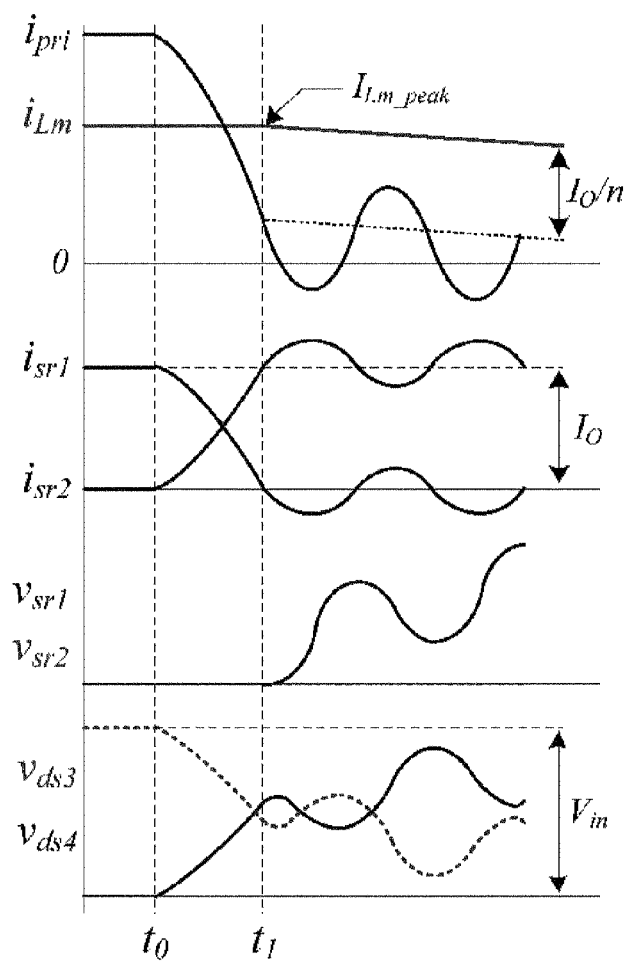
FIG. 3 is a graph illustrating signal waveforms of main components of the power supply device according to the embodiment of the present invention.

FIG. 3 is a graph illustrating signal waveforms of main components of the power supply device according to the embodiment of the present invention.

Referring to FIGS. 1 and 3, when the switching on time of the lagging leg switch is delayed (t0→t1), resonance between the switches of the full bridge 111 and the parasitic inductor $L_R$ disposed on the primary side and the output capacitor Co disposed on the secondary side may be generated.

Therefore, as illustrated, waveforms of switch voltages $V_{ds3}$ and $V_{ds4}$ of the lagging leg switches $S_3$ and $S_4$ of the full bridge 111 on the primary side may exhibit resonance and waveforms of primary side current $i_{pri}$, magnetization inductance current $i_{Lm}$, and currents $i_{sr1}$ and $i_{sr2}$ and voltages $V_{sr1}$ and $V_{sr2}$ of the first and second rectifying switches $SR_1$ and $SR_2$ may also exhibit resonance.

Figure 4A:
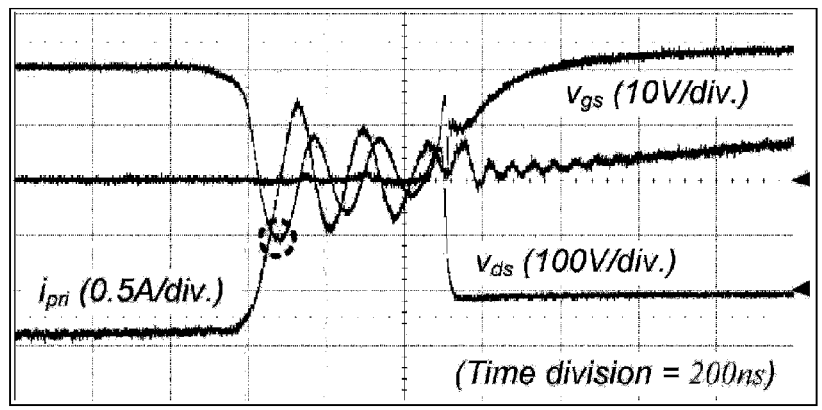
FIGS. 4A and 4B are diagrams illustrating resonance between switches of a full bridge and an output capacitor and a parasitic inductor of rectifying switches in a power supply unit employed in the power supply device according to the embodiment of the present invention.
Figure 4B:
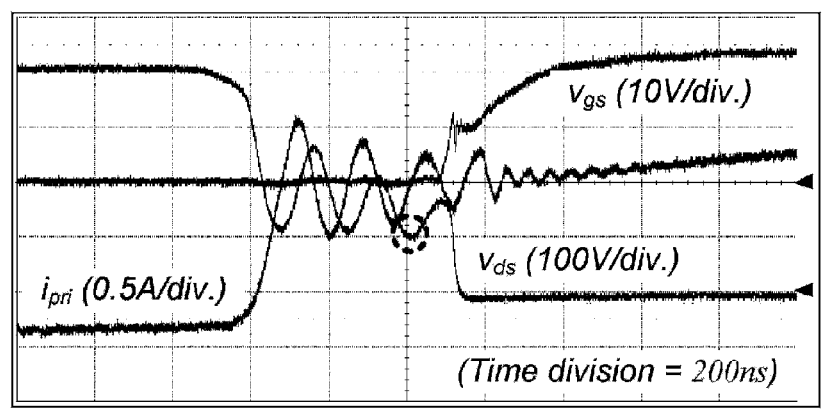

FIGS. 4A and 4B are diagrams illustrating resonance between switches of a full bridge and a parasitic inductor and an output capacitor in a power supply unit employed in the power supply device according to the embodiment of the present invention.

With reference to FIGS. 4A and 4B, it can be appreciated that switch voltages $V_{ds}$ and $V_{gs}$ of the full bridge 111 are increased and reduced according to a difference in load current. Therefore, in the case that the load current is above predetermined load current, the switching on time of the lagging leg switch is maintained as before, while in the case that the load current is below the predetermined load current, the switching on time of the lagging leg switch is delayed, thereby reducing switching loss.

Figure 5:
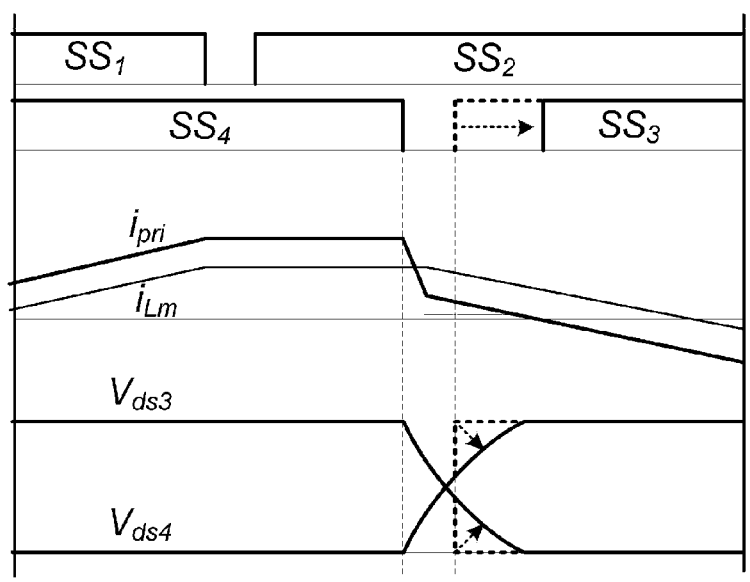
FIG. 5 is a graph illustrating zero voltage switching in the power supply device according to the embodiment of the present invention in light load condition.

FIG. 5 is a graph illustrating zero voltage switching in the power supply device according to the embodiment of the present invention in light load condition.

With reference to FIG. 5, it can be appreciated that when a load state of the power supply device according to the embodiment of the present invention corresponds to a preset light load state, the first lagging leg switching control signal SS3 is delayed. Although not illustrated, the second lagging leg switching control signal SS4 may be delayed in the same manner.

As described above, according to the embodiment of the present invention, the switching on time of the lagging leg switch may be controlled according to a load state. That is, the switching on time of the lagging leg switch is delayed in light load condition to thereby suppress a reduction in power conversion efficiency, while the switching on time of the lagging leg switch is maintained as before in heavy load condition to thereby maintain power conversion efficiency.

As set forth above, according to embodiments of the present invention, a reduction in power conversion efficiency in light load can be suppressed by controlling a switching on time of at least one of lagging leg switches according to a load state.

While the present invention has been shown and described in connection with the embodiments, it will be apparent to those skilled in the art that modifications and variations can be made without departing from the spirit and scope of the invention as defined by the appended claims.

What is claimed is:

1. A power supply device, comprising:
   a power supply unit supplying preset DC power by switching input power using a full bridge by a phase shift method; and a control unit controlling a switching time of a switch of the full bridge according to a load state in which the DC power is received from the power supply unit;

wherein the switch of the full bridge of the power supply unit includes:
  first and second leading leg switches; and
  first and second lagging leg switches;

wherein the control unit maintains a switching on time of at least one of the first and second lagging leg switches as before, in the case that the load current is above a predetermined load current; and wherein the control unit delays a switching on time of at least one of the first and second lagging leg switches, in the case that the load current is below the predetermined load current;

wherein the switching on time is a point in time of switching on the first or second lagging leg.

2. The power supply device of claim 1, wherein the control unit includes:
  a comparison unit comparing received load state information with a preset reference load state; and
  a signal generation unit generating first and second leading leg switching control signals and first and second lagging leg switching control signals and delaying a switching on time of at least one of the first and second lagging leg switching control signals according to a comparison result of the comparison unit.

3. The power supply device of claim 1, wherein the power supply unit includes:
  a transformer having a primary winding receiving power switched by the switch of the full bridge and a secondary winding electrically isolated from and magnetically coupled to the primary winding to form a preset winding ratio therewith, transforming the switched power according to the winding ratio and outputting the transformed power; and
  an output unit rectifying and stabilizing the transformed power from the secondary winding of the transformer and outputting the stabilized power.

4. The power supply device of claim 3, wherein the output unit includes:
  first and second rectifying switches connected to one end and the other end of the secondary winding, respectively; and
  an inductor and a capacitor stabilizing the power rectified by the first and second rectifying switches.

5. A power supply device, comprising:
  a power supply unit supplying preset DC power by switching input power using a full bridge by a phase shift method and rectifying and stabilizing transformed switching power; and
  a control unit controlling a switching time of a switch of the full bridge by determining a load state in which the DC power is received from the power supply unit, based on resonance between the switch of the full bridge and an output capacitor and a parasitic inductor of a rectifying switch;

wherein the switch of the full bridge of the power supply unit includes
  first and second leading leg switches; and
  first and second lagging leg switches;

wherein the control unit maintains a switching on time of at least one of the first and second lagging leg switches as before, in the case that the load current is above a predetermined load current; and wherein the control unit delays a switching on time of at least one of the first and second lagging leg switches, in the case that the load current is below the predetermined load current;

wherein the switching on time is a point in time of switching on the first or second lagging leg.

6. The power supply device of claim 5, wherein the control unit includes:
  a comparison unit comparing received load state information with a reference load state set according to the resonance between the switch of the full bridge and the rectifying switch; and
  a signal generation unit generating first and second leading leg switching control signals and first and second lagging leg switching control signals and delaying a switching on time of at least one of the first and second lagging leg switching control signals according to a comparison result of the comparison unit.

7. The power supply device of claim 5, wherein the power supply unit includes:
  a transformer having a primary winding receiving power switched by the switch of the full bridge and a secondary winding electrically isolated from and magnetically coupled to the primary winding to form a preset winding ratio therewith, transforming the switched power according to the winding ratio and outputting the transformed power; and
  an output unit rectifying and stabilizing the transformed power from the secondary winding of the transformer and outputting the stabilized power.

8. The power supply device of claim 7, wherein the output unit includes:
  first and second rectifying switches connected to one end and the other end of the secondary winding, respectively; and
  an inductor and a capacitor stabilizing the power rectified by the first and second rectifying switches.

* * * * *